(12) United States Patent
Shah et al.

(10) Patent No.: US 11,190,534 B1
(45) Date of Patent: Nov. 30, 2021

(54) LEVEL OF NETWORK SUSPICION DETECTION

(71) Applicants: Neil Shah, Los Angeles, CA (US); Hamed Nilforoshan-Dardashti, Wellesley, MA (US)

(72) Inventors: Neil Shah, Los Angeles, CA (US); Hamed Nilforoshan-Dardashti, Wellesley, MA (US)

(73) Assignee: Snap Inc., Santa Monica, CA (US)

( * ) Notice: Subject to any disclaimer, the term of this patent is extended or adjusted under 35 U.S.C. 154(b) by 274 days.

(21) Appl. No.: 16/360,600

(22) Filed: Mar. 21, 2019

(51) Int. Cl.
 *H04L 29/06* (2006.01)
(52) U.S. Cl.
 CPC ...... *H04L 63/1425* (2013.01); *H04L 63/1466* (2013.01)
(58) Field of Classification Search
 CPC ............. H04L 63/1425; H04L 63/1466; H04L 63/1433; H04L 43/045; G06F 16/9024
 See application file for complete search history.

(56) References Cited

U.S. PATENT DOCUMENTS

| | | | | |
|---|---|---|---|---|
| 10,015,182 | B1* | 7/2018 | Shintre | H04L 63/1441 |
| 10,164,995 | B1* | 12/2018 | Fang | G06F 21/577 |
| 10,268,660 | B1 | 4/2019 | Arazi | |
| 10,673,880 | B1* | 6/2020 | Pratt | G06N 20/00 |
| 2006/0178887 | A1 | 8/2006 | Webber | |
| 2008/0010225 | A1 | 1/2008 | Gonsalves et al. | |
| 2008/0098479 | A1 | 4/2008 | O'Rourke et al. | |
| 2009/0303237 | A1 | 12/2009 | Liu et al. | |
| 2011/0213801 | A1 | 9/2011 | He | |
| 2011/0307434 | A1 | 12/2011 | Rostampour et al. | |
| 2014/0317736 | A1 | 10/2014 | Cao et al. | |
| 2016/0078309 | A1 | 3/2016 | Feldman et al. | |
| 2016/0147583 | A1* | 5/2016 | Ben Simhon | H04L 43/0823 714/47.3 |
| 2016/0366168 | A1* | 12/2016 | Cazin | G06F 21/10 |
| 2017/0046519 | A1 | 2/2017 | Cam | |
| 2017/0118240 | A1* | 4/2017 | Reddy | H04L 63/1433 |
| 2019/0182273 | A1* | 6/2019 | Walsh | H04L 63/1483 |
| 2020/0293917 | A1* | 9/2020 | Wang | G06N 20/00 |
| 2020/0364366 | A1 | 11/2020 | Kundu et al. | |
| 2021/0144174 | A1 | 5/2021 | N | |

OTHER PUBLICATIONS

Ahmed Metwally, Jia-Yu Pan, Minh Doan, and Christos Faloutsos, Scalable Community Discovery from Multi-Faceted Graphs, In BigData, IEEE, 2015, pp. 1053-1062.

(Continued)

*Primary Examiner* — Joseph P Hirl
*Assistant Examiner* — Ka Shan Choy
(74) *Attorney, Agent, or Firm* — Culhane Meadows PLLC; Stephen J. Weed

(57) ABSTRACT

Systems, devices, media, and methods are presented for determining a level of abusive network behavior suspicion for groups of entities and for identifying suspicious entity groups. A suspiciousness metric is developed and used to evaluate a multi-view graph across multiple views where entities are associated with nodes of the graph and attributes of the entities are associated with levels of the graph.

20 Claims, 10 Drawing Sheets

(56) References Cited

OTHER PUBLICATIONS

Alex Beutel, Wanhong Xu, Venkatesan Guruswami, Christopher Palow, and Christos Faloutsos, Copycatch: Stopping Group Gttacks by Spotting Lockstep Behavior in Social Networks, In www.acm, 2013, pp. 119-130.

B. Aditya Prakash, Ashwin Sridharan, Mukund Seshadri, Sridhar Machiraju, and Christos Faloutsos, EigenSpokes: Surprising Patterns and Scalable Community Chipping in Large Graphs, In PAKDD, 2010, pp. 435-448, Springer.

Bryan Hooi, Hyun Ah Song, Alex Beutel, Neil Shah, Kijung Shin, and Christos Faloutsos, Fraudar: Bounding Graph Fraud in the Face of Camouflage, In KDD, ACM, 2016, pp. 895-904.

Bryan Hooi, Neil Shah, Alex Beutel, Stephan Günnemann, Leman Akoglu, Mohit Kumar, Disha Makhija, and Christos Faloutsos, Birdnest: Bayesian Inference for Ratings—Fraud Detection, In SDM, SIAM, 2016, pp. 495-503.

Cao Xiao, David Mandell Freeman, and Theodore Hwa, Detecting Clusters of Fake Accounts in Online Social Networks, In WAIS, ACM, 2015, pp. 91-101.

Charu C Aggarwal and Chengxiang Zhai, Mining Text Data, Science & Business Media, 2012, Springer.

David Mandell Freeman, Using Naive Bayes to Detect Spammy Names in Social Networks, In WAIS, ACM, 2013, pp. 3-12.

Deepayan Chakrabarti, Spiros Papadimitriou, Dharmendra S Modha, and Christos Faloutsos, Fully Automatic Cross-Associations, In KDD. ACM, 2004, pp. 79-88.

Duen Horng "POLO" Chau, Carey Nachenberg, Jeffrey Wilhelm, Adam Wright, and Christos Faloutsos, Polonium: Tera-Scale Graph Mining and Inference for Malware Detection, In SDM, 2011, SIAM, pp. 131-142.

Evangelos E. Papalexakis, Leman Akoglu, and Dino Ienco, Do More Views of a Graph Help? Community Detection and Clustering in Multi-Graphs, In FUSION, 2013, pp. 899-905, Citeseer.

Gisel Bastidas Guacho, Sara Abdali, Neil Shah, and Evangelos E. Papalexakis, Semi-Supervised Content-Based Detection of Misinformation via Tensor Embeddings, ASONAM, 2018.

Hemank Lamba, Bryan Hooi, Kijung Shin, Christos Faloutsos, and Jürgen Pfeffer, ZooRank: Ranking Suspicious Entities in Time-Evolving Tensors, InECML-PKDD, 2017, pp. 68-84, Springer.

Hing-Hao Mao, Chung-Jungwu, Evangelos E. Papalexakis, Christos Faloutsos, Kuo-Chen Lee, and Tien-Cheu Kao, MalSpot: Multi2 Malicious Network Behavior Patterns Analysis, In PAKDD, 2014, pp. 1-14, Springer.

Inderjit S Dhillon, Subramanyam Mallela, and Dharmendra S Modha, Information-Theoretic Co-Clustering, In KDD, ACM, 2003, pp. 89-98.

Jian Pei, Daxin Jiang, and Aidong Zhang, On Mining Cross-Graph Quasi-Cliques, In KDD, ACM, 2005, pp. 228-238.

Justin Ma, Lawrence K Saul, Stefan Savage, and Geoffrey M. Voelker, Beyond Blacklists: Learning to Detect Malicious Web Sites from Suspicious URLs, In KDD, ACM, 2009, pp. 1245-1254.

Kijung Shin, Bryan Hooi, and Christos Faloutsos, M-Zoom: Fast Dense-Block Detection in Tensors with Quality Guarantees, In ECML-PKDD, 2016, pp. 264-280, Springer.

Koji Maruhashi, Fan Guo, and Christos Faloutsos, MultiAspectForensics: Pattern Mining on Large-Scale Heterogeneous Networks with Tensor Analysis, In Advances in Social Networks Analysis and Mining (ASONAM), 2011 International Conference on, IEEE, 2011, pp. 203-210.

Leman Akoglu, Mary McGlohon, and Christos Faloutsos, Oddball: Spotting Anomalies in Weighted Graphs, In PAKDD, 2010, pp. 410-421, Springer.

Liang Chen, Yipeng Zhou, and Dah Ming Chiu, Analysis and Detection of Fake Biews in Online Video Services, TOMM 11, Feb. 2015, Article 44, p. 44:1-44:20.

Mark E. J. Newman, Duncan J. Watts, and Steven H. Strogatz, Random Graph Models of Social Networks, PNAS vol. 99, Suppl. 1, 2002, pp. 2566-2572.

Meng Jiang, Alex Beutel, Peng Cui, Bryan Hooi, Shiqiang Yang, and Christos Faloutsos, Spotting Suspicious Behaviors in Multimodal Data: A General Metric and Algorithms, TKDE vol. 28, No. 8, 2016, pp. 2187-2200.

Meng Jiang, Peng Cui, Alex Beutel, Christos Faloutsos, and Shiqiang Yang, CatchSync: Catching Synchronized Behavior in Large Directed Graphs, In KDD, ACM, 2014, pp. 941-950.

Meng Jiang, Peng Cui, Alex Beutel, Christos Faloutsos, and Shiqiang Yang, Inferring Lockstep Behavior from Connectivity Pattern in Large Graphs, PAKDD vol. 48, No. 2, 2016, pp. 399-428.

Meng Jiang, Peng Cui, Alex Beutel, Christos Faloutsos, and Shiqiang Yang, Inferring Strange Behavior from Connectivity Pattern in Social Networks, In PAKDD, 2014, pp. 126-138, Springer.

Moses Charikar, Greedy Approximation Algorithms for Finding Dense Components in a Graph, In APPROX, 2000, pp. 84-95, Springer.

Neil Shah, Alex Beutel, Brian Gallagher, and Christos Faloutsos, Spotting Suspicious Link Behavior with fBox, In ICDM, IEEE, 2014, pp. 959-964.

Neil Shah, Alex Beutel, Bryan Hooi, Leman Akoglu, Stephan Gunnemann, Disha Makhija, Mohit Kumar, and Christos Faloutsos, EdgeCentric: Anomaly Detection in Edge-Attributed Networks, In ICDMW, IEEE, 2016, pp. 327-334.

Neil Shah, Danai Koutra, Tianmin Zou, Brian Gallagher, and Christos Faloutsos, Timecrunch: Interpretable Dynamic Graph Summarization, In KDD, ACM, 2015, pp. 1055-1064.

Neil Shah, Flock: Combating Astroturfing on Livestreaming Platforms, In WWW, IW3C2, 2017, pp. 1083-1091.

Neil Shah, Hemank Lamba, Alex Beutel, and Christos Faloutsos, The Many Faces of Link Fraud, In CDM, IEEE, 2017, pp. 1069-1074.

Qiang Cao, Xiaowei Yang, Jieqi Yu, and Christopher Palow, Uncovering Large Groups of Active Malicious Accounts in Online Social Networks, In CCS. ACM, 2014, pp. 477-488.

Shashank Pandit, Duen Horng Chau, Samuel Wang, and Christos Faloutsos, NetProbe: A Fast and Scalable System for Fraud Detection in Online Auction Networks, InWWW, ACM, 2007, pp. 201-210.

Victor E. Lee, Ning Ruan, Ruoming Jin, and Charu Aggarwal, A Survey of Algorithms for Dense Subgraph Discovery, In Managing and Mining Graph Data, 2010, pp. 303-336, Springer.

Vincent D. Blondel, Jean-Loup Guillaume, Renaud Lambiotte, and Etienne Lefebvre, Fast unfolding of Communities in Large Networks, JSM, 2008, 10 (2008), p. 10008.

Zoltán Gyöngyi, Hector Garcia-Molina, and Jan Pedersen, Combating Web Spam with TrustRank, In VLDB, 2004, pp. 576-587.

\* cited by examiner

LEVEL OF NETWORK SUSPICION DETECTION

TECHNICAL FIELD

Examples set forth in the present disclosure relate generally to social network security and privacy. More particularly, but not by way of limitation, the present disclosure addresses systems and methods for detecting levels of suspicion (e.g., abusive network behavior) on online social platforms.

BACKGROUND

Online social platforms interconnect users. Bad actors attempt to exploit these social networks through unauthorized account creation efforts, social media spam through propagation of content over a network, account hijacking efforts for purposes of humiliation or exploitation, and more.

BRIEF DESCRIPTION OF THE DRAWINGS

The disclosed subject matter is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. To easily identify the discussion of any particular element or act, the most significant digit or digits in a reference number refer to the figure number in which that element is first introduced. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION

Figure 1:
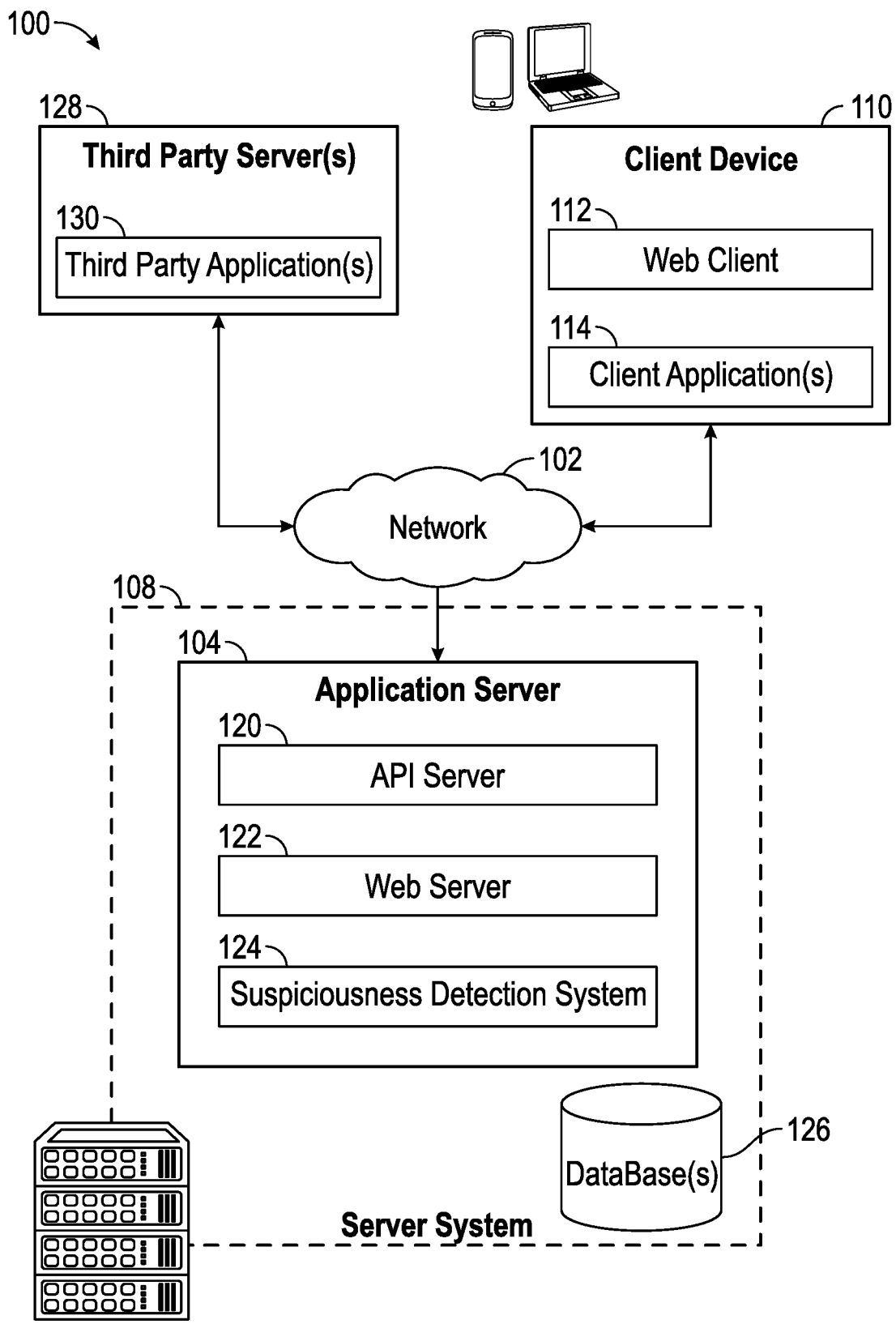
FIG. 1 is a block diagram of an example suspiciousness detection system in an online client-server system.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

In accordance with one example, a method is provided for determining a level of suspicion for a group of entities from a dataset of entity and entity attribute information. The method includes receiving, at a processor, entity identifiers and attribute identifiers; generating, by the processor, a multi-view graph from the dataset of entity and entity attribute information using the entity identifiers and the attribute identifiers, each node of the multi-view graph corresponding to a respective one of the entity identifiers, each view of the multi-view graph corresponding to a respective one of the attribute identifiers, and each edge between the nodes of a respective view having an edge weight corresponding to attribute value overlap between those nodes in that view; identifying, by the processor, a multi-view sub-graph within the multi-view graph, the multi-view sub-graph including more than one view for the group of entities; and determining, by the processor, the level of suspicion of the group of entities by scoring the identified multi-view sub-graph using the edge weights corresponding to the multi-view sub-graph for the group of entities.

In accordance with another example, a system is provided for determining a level of suspicion for a group of entities from a dataset of entity information. The example system includes a memory that stores instructions and a processor configured by the instructions to perform operations. The operations performed by the processor include receiving entity identifiers and attribute identifiers; generating a multi-view graph from the dataset of entity information using the entity identifiers and the attribute identifiers, each node of the multi-view graph corresponding to a respective one of the entity identifiers, each view of the multi-view graph corresponding to a respective one of the attribute identifiers, and each edge between the nodes of a respective view having an edge weight corresponding to attribute value overlap between those nodes in that view; identifying a multi-view sub-graph within the multi-view graph, the multi-view sub-graph including more than one view for the group of entities; and determining the level of suspicion of the group of entities by scoring the identified multi-view sub-graph using the edge weights corresponding to the multi-view sub-graph for the group of entities.

In accordance with another example, a non-transitory processor-readable storage medium is provided that stores processor-executable instructions that, when executed by a processor of a machine, cause the machine to perform operations. The operations performed by the machine include receiving, at a processor, entity identifiers and attribute identifiers; generating, by the processor, a multi-view graph from the dataset of entity information using the entity identifiers and the attribute identifiers, each node of the multi-view graph corresponding to a respective one of the entity identifiers, each view of the multi-view graph corresponding to a respective one of the attribute identifiers, and each edge between the nodes of a respective view having an edge weight corresponding to attribute value overlap between those nodes in that view; identifying, by the processor, a multi-view sub-graph within the multi-view graph, the multi-view sub-graph including more than one view for the group of entities; and determining, by the processor, the level of suspicion of the group of entities by scoring the identified multi-view sub-graph using the edge weights corresponding to the multi-view sub-graph for the group of entities.

Many online social platforms have an enormous user base. The ability to reach large numbers of users incentivizes bad actors to engage in abusive behavior for profit and political gain. These behaviors include activities that are damaging to the user base of the social platforms such as unauthorized account creation efforts, social media spam through propagation of content over a network, account hijacking efforts for purposes of humiliation or exploitation, and more. As a result, the online community expends substantial resources reacting to and combating these abusive behaviors.

FIG. 1 is a block diagram illustrating a system 100, according to some examples, configured to automatically detect suspicious groups of entities (e.g., groups of users) and a level of suspicious activity (suspiciousness) of individual groups. The system 100 includes one or more client devices such as client device 110. The client device 110 includes, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform. For example, the client device 110 may be used to input information to create an account, send spam by propagating content over a network 102, hijack an existing account for purposes of humiliation or exploitation, and so forth.

For example, client device 110 is a device of a user who is attempting unauthorized access to an online social platform. Client device 110 accesses a website on the social platform (e.g., hosted by server system 108) directly or through one or more third party servers 128 (e.g., utilizing one or more third-party applications 130). Application server 104 records access attempts and associated data (e.g., IP address of origin) as a dataset in database 126. By analyzing the dataset using techniques disclosed herein, the application service 104 is able to identify suspicious entities or groups of entities attempting unauthorized access and how suspicious those entities are.

The inventors discovered that many types of abusive online behavior can be detected by identifying groups of entities that share properties with one another across multiple attributes (sybil accounts created at the same time and location, propaganda spreaders broadcasting articles with the same rhetoric and with similar reshares, etc.). Tackling online misbehavior is a challenging problem, given its variance with respect to manifestation across platforms, incentive structures and time. Despite these challenges, the examples described herein can successfully extensibly identify abusive behaviors such as discovering online e-commerce scammers given profile creation, posting and e-mail address attributes and pinpointing fraudulent advertisers given attributes like ad URLs, targeting criteria and key phrases. This is achievable by leveraging the inventor's insight that groups of entities who share too many, and too unlikely, attribute values are unusual and worth investigating.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, another type of network, or a combination of two or more such networks.

The client device 110 may access the various data and applications provided by other entities in the system 100 via web client 112 (e.g., a browser) or one or more client applications 114. The client device 110 may include one or more client application(s) 114 (also referred to as "apps") such as, but not limited to, a web browser, messaging application, electronic mail (email) application, an e-commerce site application, a mapping or location application, an online home buying and selling application, a real estate application, and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

A server system 108 provides server-side functionality via the network 102 (e.g., the Internet or wide area network (WAN)) to: one or more third party server(s) 128, and one or more client devices 110. The server system 108 includes an application program interface (API) server 120, a web server 122, and a suspiciousness detection system 124, that may be communicatively coupled with one or more database(s) 126. The one or more database(s) 126 may be storage devices that store data (e.g., in a dataset) related to users of the server system 108, applications associated with the server system 108, cloud services, housing market data, and so forth. The one or more database(s) 126 may further store information related to third party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application. In one example the server system 108 includes a suspiciousness detection system 124. Suspiciousness detection system 124 may include one or more servers and may be associated with a cloud-based application. Suspiciousness detection system 124 may obtain user information associated with an online social platform from database(s) 126. The suspiciousness detection system 124 analyzes a dataset including the user/entity information to determine a level of suspicion for groups of entities and to identify suspicious groups of entities. The details of the suspiciousness detection system 124 are provided below in connection with FIGS. 2A, 2B, and 2C.

The system 100 further includes one or more third party server(s) 128. The one or more third-party server(s) 128 may include one or more third-party application(s) 130. The one or more third-party application(s) 130, executing on third party server(s) 128 may interact with the server system 108 via API server 120 via a programmatic interface provided by the API server 120. For example, one or more of the third-party applications 130 may request and utilize information from the server system 108 via the API server 120 to support one or more features or functions on a website hosted by the third party or an application hosted by the third party. The third-party application(s) 130, for example, may provide software version analysis functionality that is supported by relevant functionality and data in the server system 108.

Figure 2A:
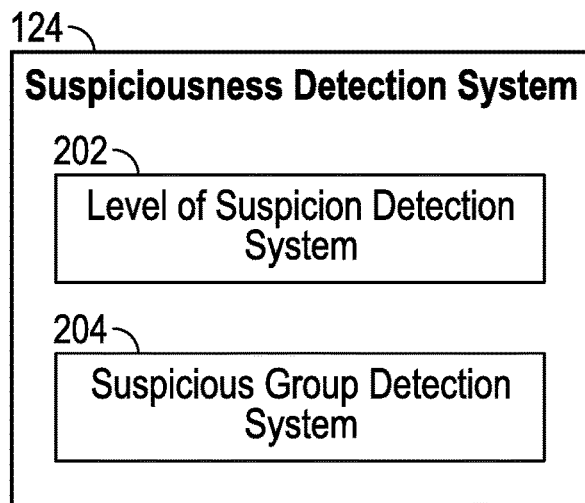
FIG. 2A is a block diagram illustrating an example suspiciousness detection system.
Figure 2B:
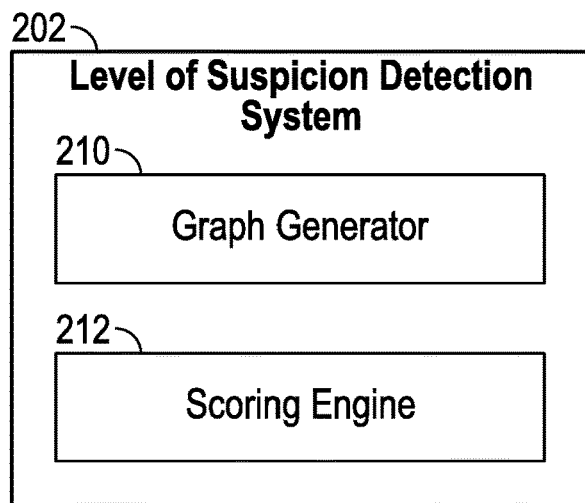
FIG. 2B is a block diagram illustrating an example level of suspicion detection system.
Figure 2C:
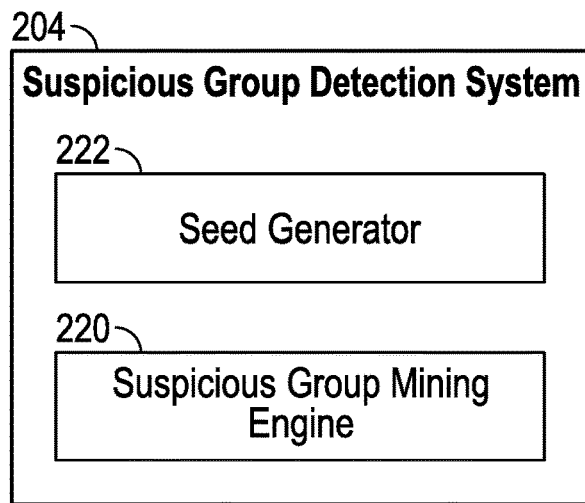
FIG. 2C is a block diagram illustrating an example suspicious group detection system.

FIG. 2A is a block diagram illustrating an example suspiciousness detection system 124. The illustrated suspiciousness detection system includes a level of suspicion detection system 202 and a suspicious group detection system 204. As shown in FIG. 2B, the level of suspicion detection system 202 includes a graph generator 210 and a scoring engine 212. As shown in FIG. 2C, the suspicious group detection system 204 includes a seed generator 222 and a suspicious group mining engine 220. It will be understood by one of skill in the art that the level of suspicion detection system 202 and the suspicious group detection system 204 may operate in conjunction with one another or may be separate systems.

The suspiciousness detection system 124 generates and operates on a dataset including a multi-view graph (MVG) having entities and attributes associated with those entities. In the multi-view graph, entities (e.g., an account, an organization, etc.) are associated with nodes, and attributes of the entities (e.g., files uploaded, IP addresses used, etc.) are associated with levels. The edges/connections between the nodes in a given level are associated with an overlap (i.e., non-zero edges) having a weight representing a degree of connectedness between the entities associated with those nodes for the attribute associated with that level.

Thus, an MVG is a type of graph including multiple views of interactions, typically in the form of distinct edge types. This enables consideration of who purchased what, who rates what, and who watched what relationships, for example, as different views in a graph between users and products. Each view of an MVG can individually be considered as a single facet or mode of behavior, and spans over the same, fixed set of nodes.

Figure 3A:
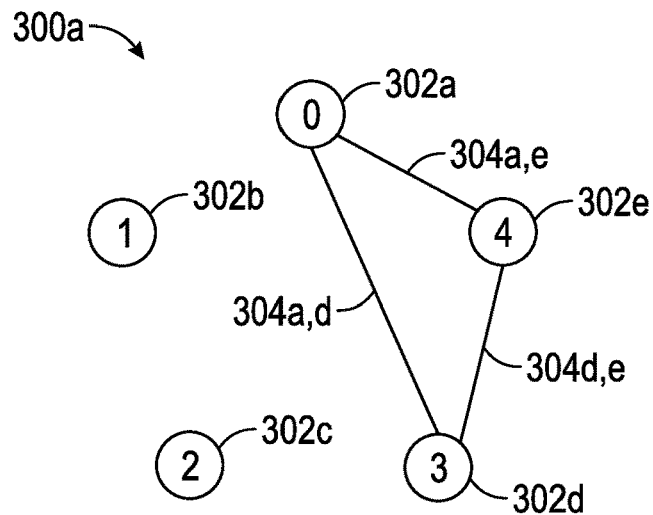
FIGS. 3A, 3B, and 3C are diagrams of three respective levels of a multi-level graph.
Figure 3B:
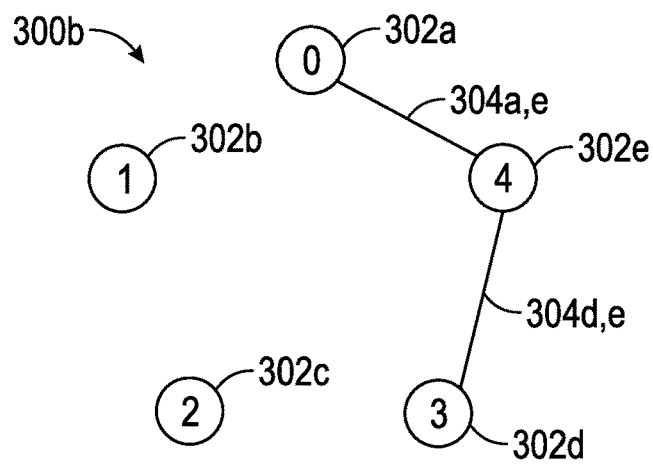
Figure 3C:
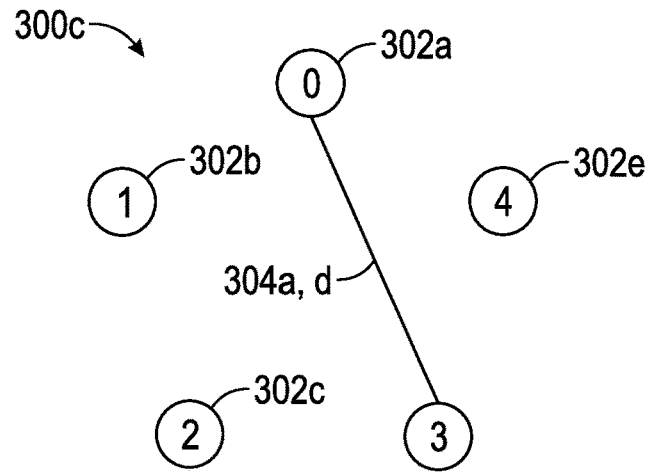

FIGS. 3A-3C depict three example levels, respectively, from an example multi-view graph. FIG. 3A depicts a first level 300a including 5 nodes/entities 302a-e (identified by numerals 0-4, respectively; node ID) and edges 304 between those nodes. Corresponding small letter designations refer to the particular edge between respective nodes, e.g., edge 304a, e refers to the edge between node 302a and node 302e. As seen in FIGS. 3A-3C the edges 304 between the same nodes may change based on the level due to each level representing different attributes the entities may share.

Table 1 includes example values for the nodes 302 in three example levels 302 (IP Address, Link ID, and Assets). The edges 304a, d, 304d, e, and 304a, e in FIG. 3A represent the shared IP Address between nodes 0, 3, and 4 ({1.2.3.4}; the edges 304a, e and 304d, e in FIG. 3B represent the shared link ID between nodes 0 and 4 ({b1c35}) and between nodes 3 and 4 ({a6wu7}); and the edge 304a, d in FIG. 3C represents the shared asset between nodes 0 and 3 ({Cheap-Iphone.jpg}).

TABLE 1

| ID | IP Address | Link ID | Assets |
| --- | --- | --- | --- |
| 0 | {1.2.3.4} | {b1c45} | {Cheap-Iphone.jpg} |
| 1 | {103.71.11.5} | {ytnw71} | {Smoothie.jpg} |
| 2 | {201.27.18.6} | {1m572d} | {main.jpg} |
| 3 | {112.11; 16.1; 1.2.3.4} | {a6wu7} | {Promotion-1.jpg, Cheap-Iphone.jpg) |
| 4 | {1.2.3.4} | {a6wu7, b1c45} | {Cheap-Rolex.jpg} |

As used herein, multi-view sub-graph, MVSG, refers to one or more of the levels 300 within a multi-view graph, MVG, including one or more of the entities/nodes 302 within those levels 300. In one example, at least one of the multi-view sub-graphs being acted upon by the suspiciousness detection system 124 includes two or more of the attributes/levels 300.

FIGS. 4A-E depict example axioms for use in producing a suspiciousness metric for determining a level of suspicion for a group, e.g., by the level of suspicion detection system 202, and/or for determining suspicious groups, e.g., by the suspicious group detection system 204. The axioms enable definition of a suspiciousness metric that is able to address questions such as, "which is more suspicious: 5 organizations with the same IP address and URL, or 10 organizations with the same postal code and creation date?."

To define the axioms, a set of N entities with K associated attribute types over the attribute value spaces $A_1 \ldots A_K$, are considered where N equals the number of entities, K equals the number of total attributes (graph views), and $A_1$ equals the set of possible values for attribute i. For notational convenience, an attribute-value mapping functions $A_1 \ldots A_K$ for the K attribute spaces, respectively, are used such that $A_i : G \rightarrow 2^{A_i}$, where G equals the MVG over all views. Effectively, $A_i(a)$ denotes the subset of attribute values from A associated with node $a \in G$. This may be construed as an MVG G on N nodes (entities) and K views (attributes), such that G is a set of individual graph views $\{G_1 \ldots G_K\}$. For convenience, the notations $G_i$ and $G_{\vec{K}}$ are used to refer to a specific graph view, and a specific subset of graph views ($\vec{K}$ is a K-length vector indicator), respectively. An edge a↔b is considered with weight $w_i^{(a,b)} > 0$ in view $G_i$ to exist between nodes a,b if $A_i(a) \cap A_i(b) \neq \emptyset$ (i.e., a and b share at least one common feature value on the $i^{th}$ attribute). $A_i(a) \cap A_i(b) = \emptyset$ (no overlap between feature values) is treated as if there is no edge between a,b in $G_i$, or equivalently that $w_i(a,b)=0$. Non-negative weights are considered so that $w_i(a,b) \in R^+$. Generally, large weights between $A_i(a)$ and $A_i(b)$ indicate intuitively higher, or more rare similarities.

Several preliminaries aid in formalizing the axiom criteria. Informally, an MVSG X of n≤N nodes and k≤K views as a subset of nodes, views or both from G are considered; denoted compactly as X⊆G, and sometimes to refer to the associated node set as X. Indexing notation is also used in the MVG case such that $X_i$ and $X_{\vec{K}}$ refer to a specific sub-graph view, and a subset of sub-graph views, respectively.

The term mass of $X_i$ is used to refer to $c_i = \Sigma_{(a,b) \in X^2} w_i^{(a,b)}$, which represents the total sum of edge weights for all edges between nodes in X. The term volume of $X_i$ is used to refer to v=n choose 2=n(n−1)/2, which denotes the possible number of edges between n nodes. The volume of $X_i$ is invariant to the view chosen and is only dependent on n (thus, the subscript is dropped). The term density of $X_i$ is used to refer to the ratio between its mass and volume, or $\rho_i = c_i/v_i$. Analogs for mass, volume, and density of the associated MVG $G_i$ are referenced with $C_i$, V, and $P_i$, respectively. In general, upper-case variables denote properties of G, while lower-case letters denote properties of X.

Figure 4A:
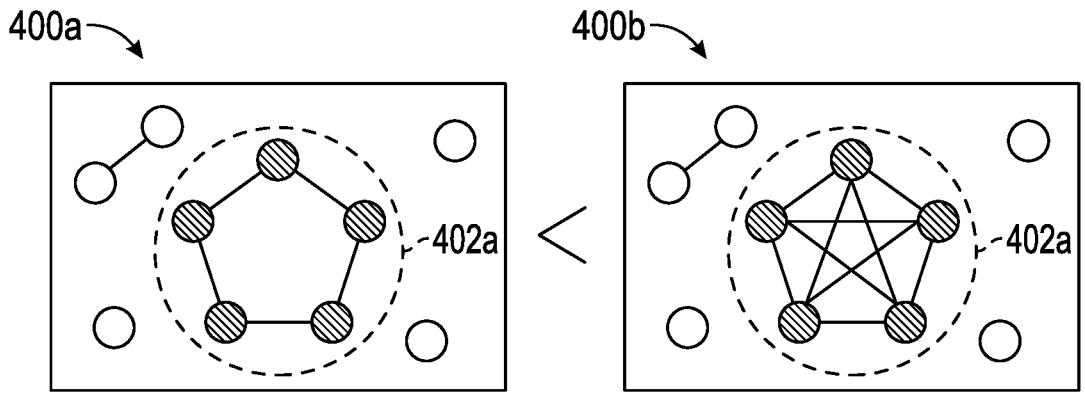
FIGS. 4A, 4B, 4C, 4D, and 4E are diagrams of five respective axioms for use in defining a suspiciousness metric.

FIG. 4A represents a first axiom in which connections for a node group 402a in a first view 400a are compared to connections for that same node group 402a in a second view 400b in a system where all other views are the same. When other sub-graph attributes are held constant, suspiciousness constitutes higher mass (Axiom 1). In accordance with the first axiom, the connections within the second view 400b are more suspicious due to a greater number of connections. For Axiom 1 (mass), given two sub-graphs X,X'⊆G with the same volume, and same mass in all except one view such that $c_i > c_i'$, X is more suspicious. Formally, $c_i > c_i' \Rightarrow f(n, \vec{c}, N, \vec{C}) > f(n, \vec{c}', N, \vec{C})$.

Figure 4B:
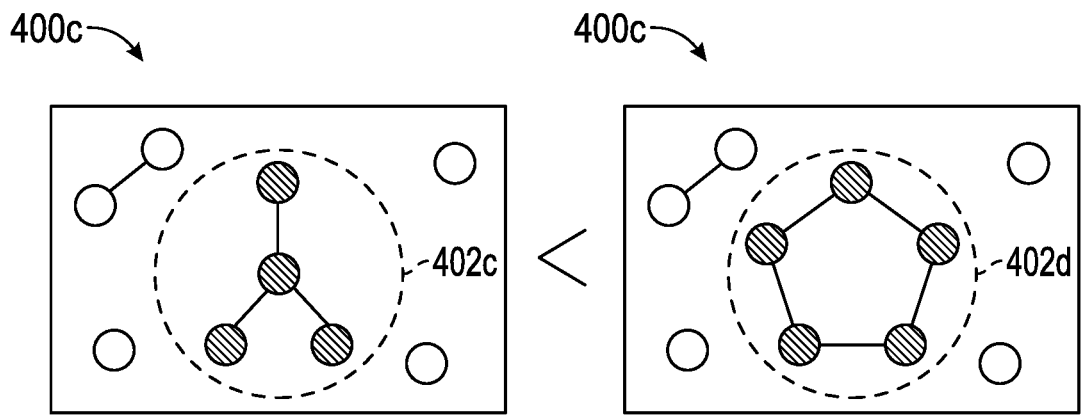

FIG. 4B represents a second axiom in which connections for a first node group 402c in a view 400c are compared to connection for a second node group 402d in the same view 400c. When other sub-graph attributes are held constant, suspiciousness constitutes larger volume with fixed density (Axiom 2). In accordance with the second axiom, the connections of the second node group 402d are more suspicious due to the greater number of connected group members. For Axiom 2 (size), given two sub-graphs X,X'⇒G with the same densities $\vec{p}$, but different volume such that v>v', X is more suspicious. Formally, $v > v' \Rightarrow f(n, \vec{p}, N, \vec{P}) > f(n', \vec{p}, N, \vec{P})$.

Figure 4C:
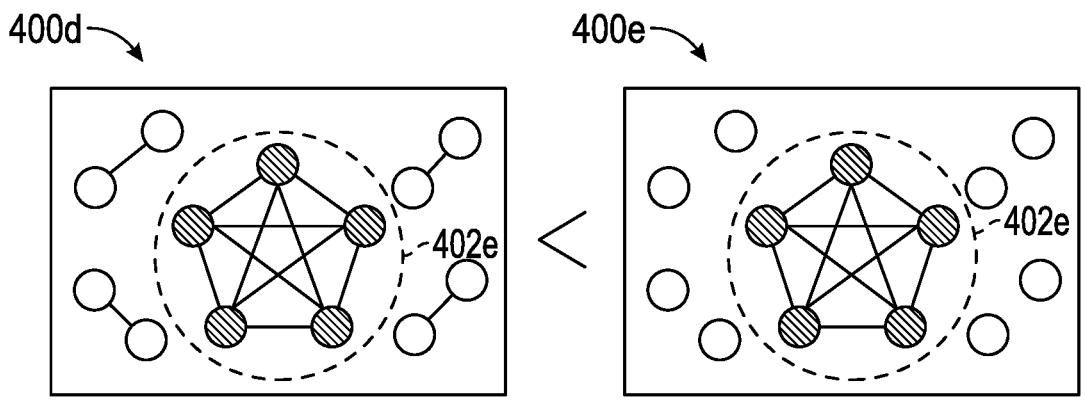

FIG. 4C represents a third axiom in which all connections in a first view 400d are compared to all connections in a second view 400e. When other sub-graph attributes are held constant, suspiciousness constitutes higher sparsity in overall graph (Axiom 3). In accordance with the third axiom, the connections of a group 402e are more suspicious if there are fewer connections between non-group members. For Axiom 3 (contrast), given two sub-graphs X⊆G, X'⊆G' with the same masses $\vec{c}$ and size v, such that G and G' have the same density in all except one view such that $P_i < P_i'$, X is more suspicious. Formally, $P_i < P_i' \Rightarrow f(n, \vec{p}, N, \vec{P}) > f(n, \vec{p}, N, \vec{P}')$.

Figure 4D:
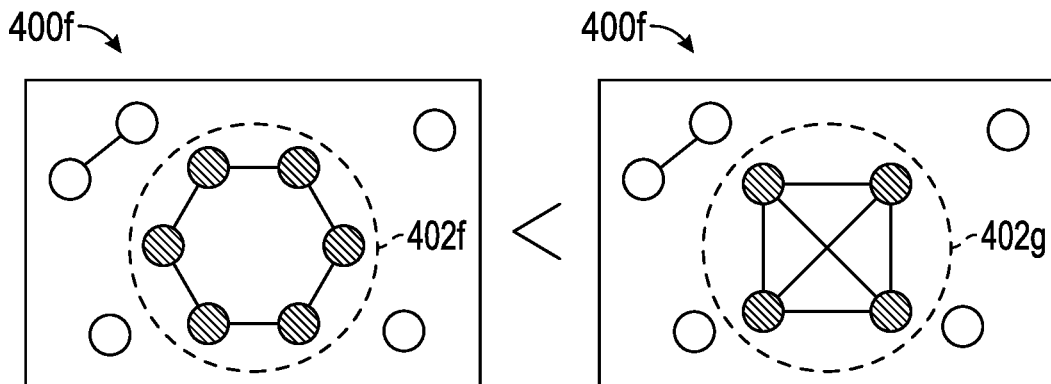

FIG. 4D represents a fourth axiom in which connections of a first group 402f within a view 400f are compared to connections of a second group 402g within the view 400f. When other sub-graph attributes are held constant, suspiciousness constitutes higher density (Axiom 4). In accordance with the fourth axiom, the connections from a group 402g are more suspicious if there are more shared connections. For Axiom 4 (concentration), given two sub-graphs X,X'⊆G with same masses $\vec{c}$, but different volume such that v<v', X is more suspicious. Formally, $v < v' \Rightarrow f(n, \vec{c}, N, \vec{C}) > f(n', \vec{c}, N, \vec{C})$.

Figure 4E:
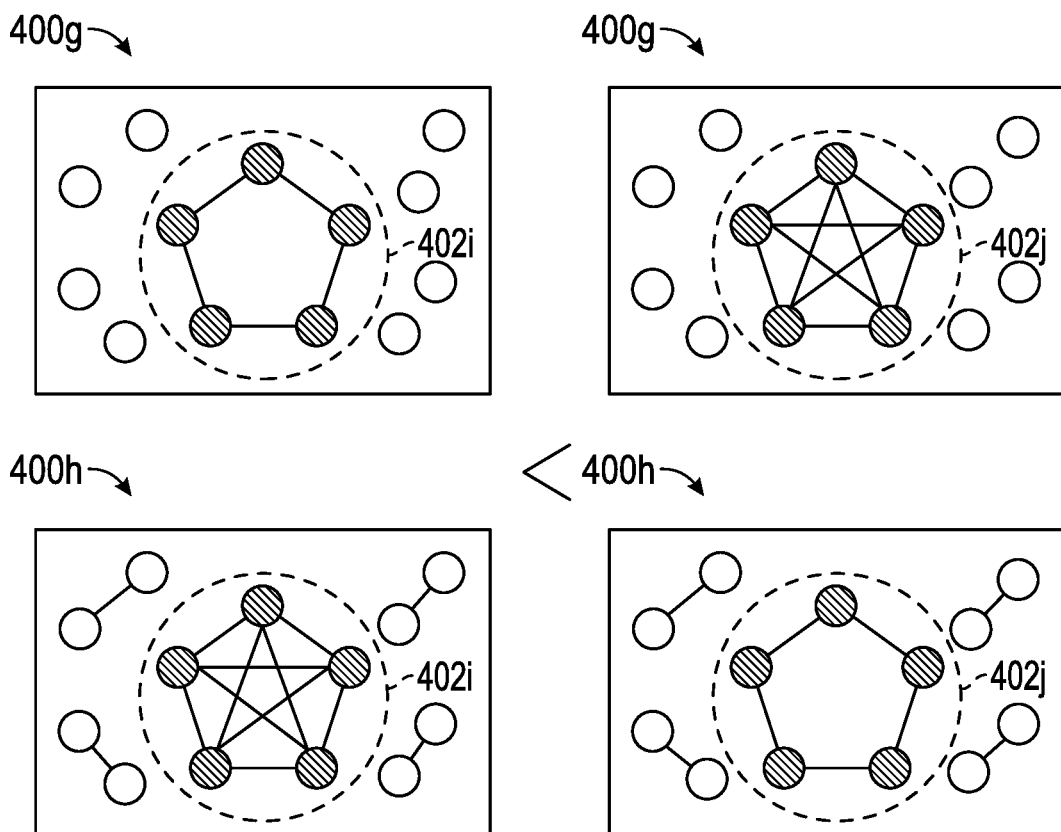

FIG. 4E represents a fifth axiom in which multiple-views are considered. When other sub-graph attributes are held constant, suspiciousness constitutes more mass distributed in sparser views (Axiom 5). In accordance with the fifth axiom, given all views are the same except a first view 400g and a second view 400h, the connections of a first group 402j and a second group 402i are more suspicious if there are less overall connections between non-group members in the levels being considered. For Axiom 5 (cross-view distribution), given two sub-graphs X,X'⊆G with same volume v and same mass in all except two views i,j with densities $P_i < P_j$ such that X has $c_i=M, c_j=m$ and X' has $c_i=m, c_j=M$ and M>m, X is more suspicious. Formally, $P_i < P_j \wedge c_i' > c_i \wedge c_j < c_j' \wedge c_i + c_j = c_i' + c_j' f(n, \vec{c}, N, \vec{C}) > f(n, \vec{c}', N, \vec{C})$.

Figure 5:
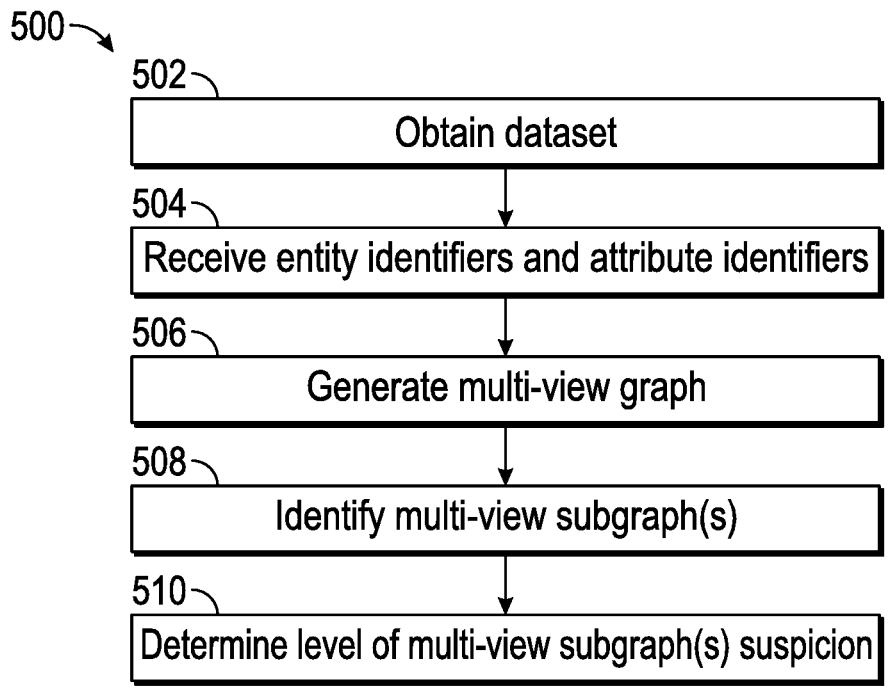
FIG. 5 is a flow diagram illustrating an example method for determining a level of suspicion for a group of entities.
Figure 6:
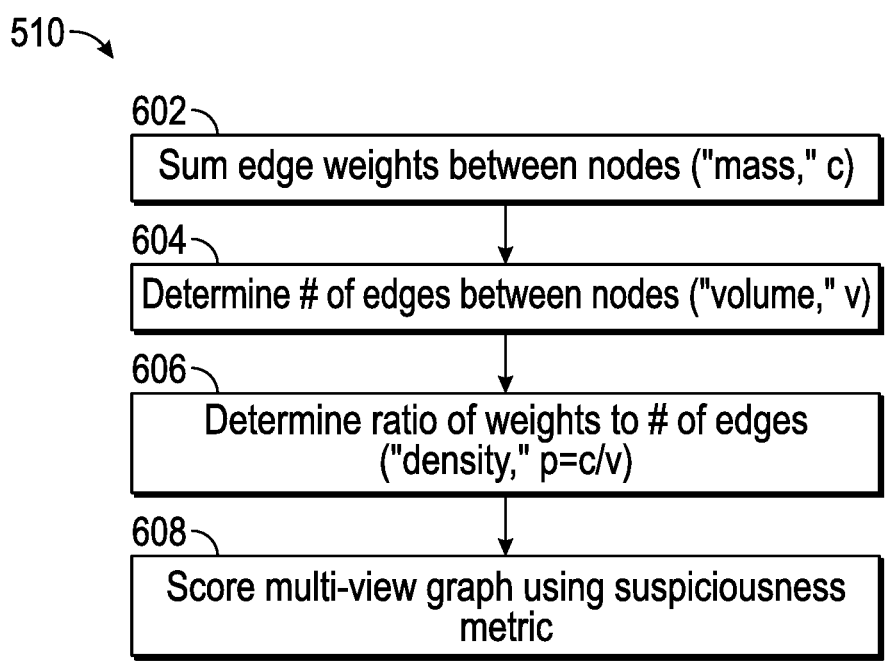
FIG. 6 is a flow diagram illustrating an example method for determining the level of suspicion in the example method of FIG. 5.
Figure 7:
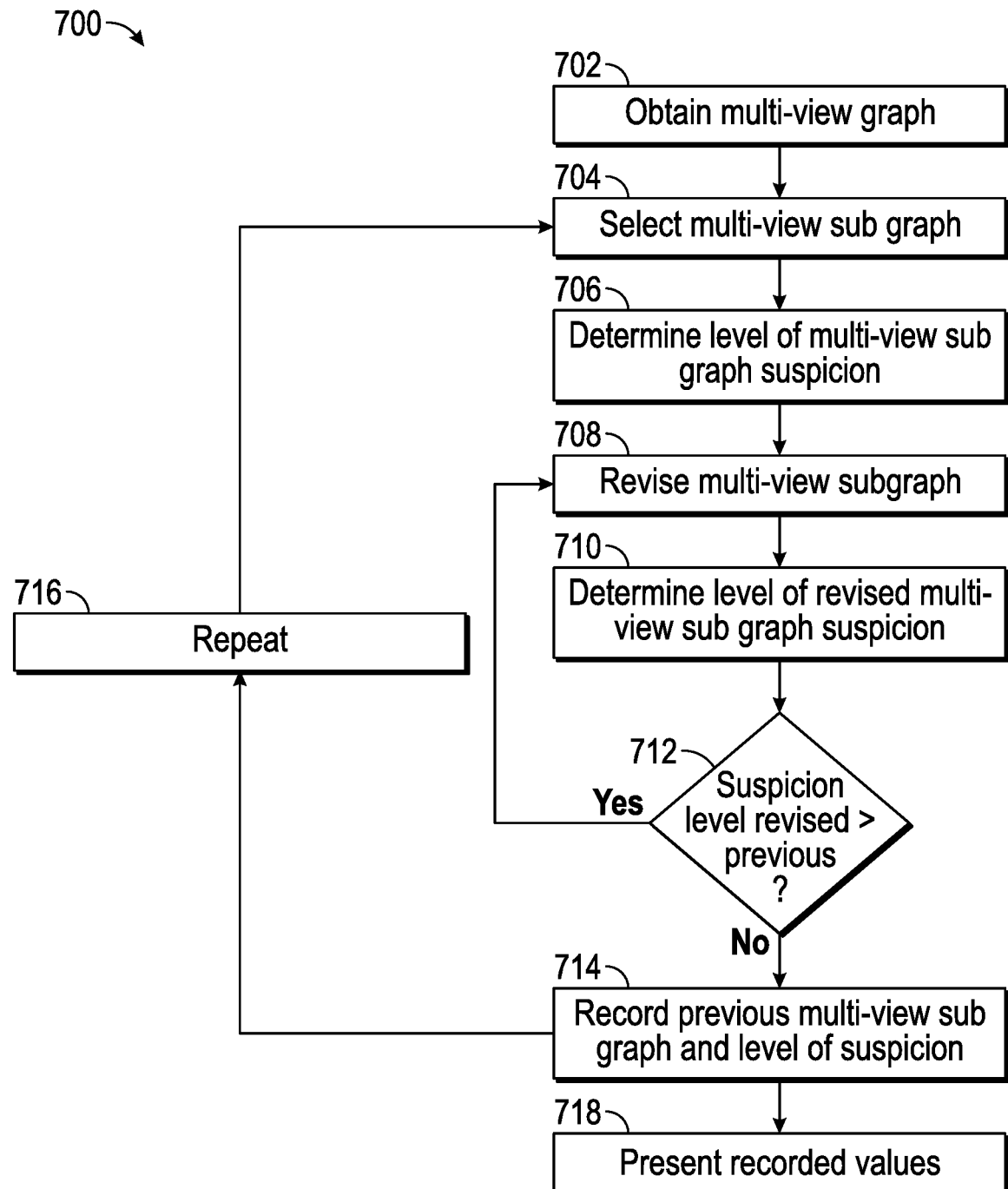
FIG. 7 is a flow diagram illustrating an example method for identifying suspicious groups.
Figure 8:
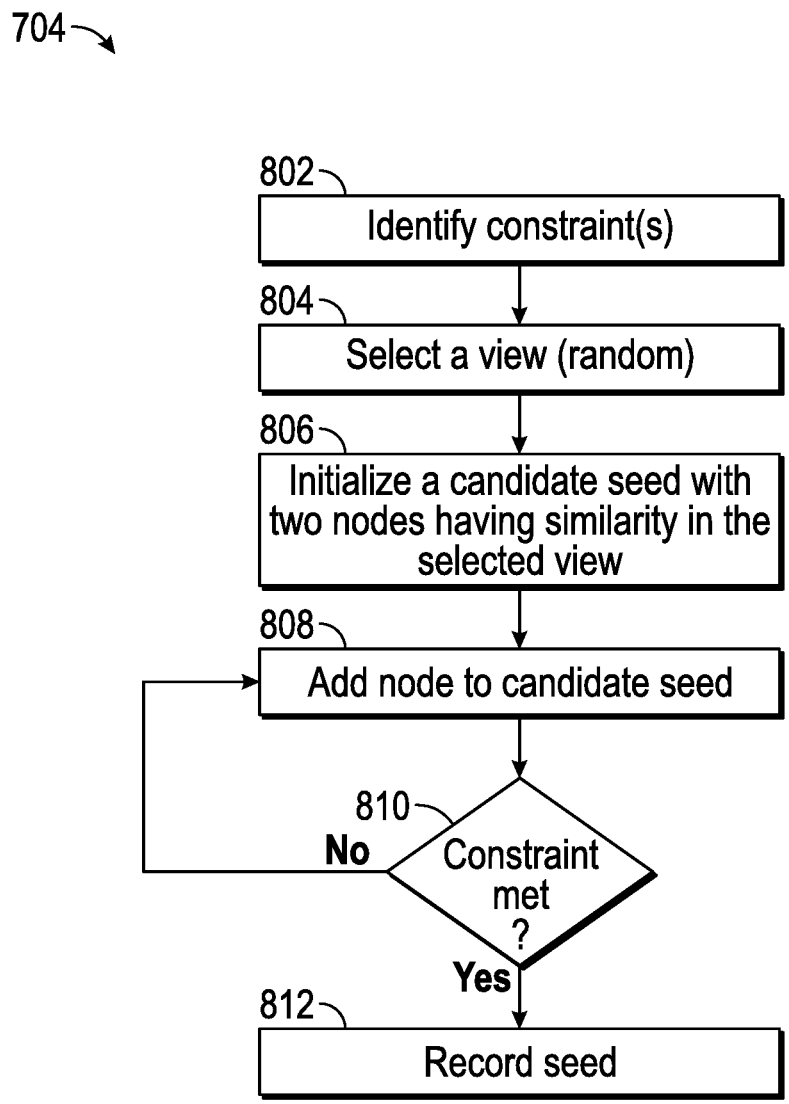
FIG. 8 is a flow diagram illustration an example method for identifying seed values for use in the example method of FIG. 7.

FIGS. 5 and 6 depict flowcharts for detecting a level of suspicion, e.g., using level of suspicion detection system 202. FIGS. 7 and 8 depict flowcharts for detecting suspicious groups, e.g., using suspicious group detection system 204. Although the flowcharts may describe the operations as a sequential process, many of the operations can be performed in parallel or concurrently. In addition, the order of the operations may be re-arranged. A process is terminated when its operations are completed. A process may correspond to a method, a procedure, etc. The steps of a method may be performed in whole or in part, may be performed in conjunction with some or all of the steps in other methods, and/or may be performed by any number of different systems, such as the systems described in FIGS. 1-3, 9 and 10.

FIG. 5 is a flow diagram illustrating an example method 500 for detecting a level of suspiciousness, e.g., using the suspiciousness detection system 124. Although the below description of the method 500 refers to the suspiciousness detection system 124, other systems for detecting a level of suspiciousness will be understood from the description herein.

At block 502, the suspiciousness detection system 124 obtains a data set. The data set includes entity information and attributes associated with those entities. The level of suspicion detection system 202 may obtain the data set from recorded network activity stored in the database 126 of the server system 108.

At block 504, the suspiciousness detection system 124 obtains entity identifiers and attribute identifiers. The level of suspicion detection system 202 may receive the entity identifiers and attribute identifiers manually, e.g., from a user via API server 120 and/or web server 122, and/or may automatically identify entity identifiers and/or attribute identifiers by parsing the data set retrieved from database 126.

At block 506, the level of suspicion detection system 202 generates a multi-view graph. The graph generator 210 generates the multi-view graph from the recorded network activity data set obtained from the database 126 using the entity identifier to create nodes and the attribute identifiers to create levels. The graph generator 210 then establishes edges 304 between the nodes 302 based on the overlap between the attributes in a given level 300 for the nodes 302.

At block 508, the level of suspicion detection system 202 identifies a multi-view sub-graph within the generated multi view graph. The level of suspicion detection system 202 identifies the multi-view sub-graph by specifying the entity (ies)/node(s) and the attribute(s)/level(s) for analysis. The level of suspicion detection system 202 may specify the entity identifiers and attribute identifiers manually, e.g., by receiving selections from a user via API server 120 and/or web server 122, and/or may automatically specify entity identifiers and/or attribute identifiers through sequential or random selection.

At block 510, the level of suspicion detection system 202 determines a level of suspicion for the identified multi-view sub-graph. The scoring engine 212 of the level of suspicion detection system 202 may determine the level of suspicion by applying a scoring metric that conforms to the axioms described above with reference to FIGS. 4A-4E. Given an MVG G, the MVSG scoring metric $f:S \rightarrow R$ is defined over the set S of candidate MVSGs which satisfies Axioms 1-5.

FIG. 6 depicts an example method for determining a level of suspicious for a multi-view sub-graph. At block 602, sum the edge weights between nodes (referred to herein as "mass," c). At block 604, determine the number of edges between nodes (referred to herein as "volume," v). At block 606, determine a ratio of weights to the number of edges (referred to herein as "density," p=c/v). At block 608, score the multi-view sub-graph using a suspiciousness metric, which quantifies groups of entities (entity group) suspiciousness in multi-view graphs (multi-attribute settings). An example MVSG scoring metric is provided by Equation 1.

$$\hat{f}(n, \vec{p}, N, \vec{P}) = \sum_{i=1}^{K} v\log(P_i) - v\log(\rho_i) - v + \log\rho_i + v\frac{\rho_i}{P_i} \quad (1)$$

The example MVSG scoring metric is based on an underlying data model for G in which undirected edges between the N nodes are independent and identically distributed within each of the K views, i.e., an Erdös-Rényi model. This model is extended to multi graph views and weighted cell values instead of binary ones. Extending the model to multi graph views enables support of multi-attribute or multi-view settings in which behaviors in one view may be very different than another (i.e. shared IP addresses may be much rarer than shared postal codes). Extending the model to weighted cell values supports the use of continuous edge weights $w_i^{(a,b)} \in \mathbb{R}^+$ capable of richly describing arbitrarily complex notions of similarity between multiple entities (i.e. incorporating both number of shared properties, as well as their rarities). A Multi-View Erdös-Rényi-Exponential model (MVERE) is used to handle the extensions. A multi-view graph G generated by the MVERE model is defined such that $w_i^{(a,b)} \sim \text{Exp}(\lambda_i)$ for $a \leftrightarrow b \in G_i$.

The MVERE model's Exponential distribution is continuous and defined on support $\mathbb{R}^+$ (which is intuitive as similarity is generally nonnegative) and it has a mode 0 (which is intuitive given that sharing behaviors are sparse since most entities should not share properties, and the likelihood of observing high-similarity drops rapidly).

Given that there are $V = N(N-1)/2$ edges (including 0-weight edges) in each view, we can derive a closed-form maximum likelihood estimation (MLE) as $\lambda_i = N(N-1)/(2C_i) = V/C_i = P_i^{-1}$. The distribution of single-view MVSG mass can be represented as the mass $M_i$ of a MVERE distributed subgraph of $\text{Exp}(\lambda_i)$ follows $M_i \sim \text{Gamma}(v, P_i^{-1})$.

The suspiciousness of a given MVSG X across multiple views may be defined in terms of the likelihood of observing some quantity of mass in those views. For example, the suspiciousness, f, of an MVSG X with $M_i \sim \text{Gamma}(v, P_i^{-1})$ and volume v is the negative log-likelihood of its mass $\vec{c}$ under the MVERE model $f(n, \vec{c}, N, \vec{C}) = -\log(\prod_{i=0}^{K} \Pr(M_i = c_i))$. This can be expanded as $$\sum_{i=1}^{K} -v\log\left(\frac{V}{C_i}\right) + \log\Gamma(v) - (v-1)\log c_i - \frac{Vc_i}{C_i}$$

and further expanded as $$\sum_{i=1}^{K} v\log\left(\frac{C_i}{V}\right) + v\log v - v - \log v - v\log c_i + \log c_i + \frac{Vc_i}{C_i},$$

which is due to $\log \Gamma(v) = \log v! - \log v$ and applying Stirling's approximation to simplify $\log v! \approx v \log v - v$. Suspiciousness is then written in terms of densities $\vec{p}, \vec{P}$ by introducing a so-parameterized variant $\hat{f}$ where $p_i = c_i/v$ and $P_i = C_i/v$ and simplifying to obtain Equation 1 above.

FIG. 7 is a flow diagram illustrating an example method 700 for detecting suspicious groups, e.g., using the suspiciousness detection system 124. Although the below description of the method 700 refers to the suspiciousness detection system 124, other systems for detecting suspicious groups will be understood from the description herein. The suspicious group detection systems and methods described herein provides scalable ranking and discovery of malicious behaviors across multiple entities and graph views, enabling discovery of integrity violations like e-commerce fraud.

Given an MVSG scoring metric such as shown in equation 1, the method of FIG. 7 enables automatic extraction of MVSGs with relatively high scores. This is a challenging problem, as computing a score for each possible MVSG in G is intractable given there are $2^N-1$ non-empty candidate node subsets, and $2^K-1$ non-empty view subsets to consider. The algorithm starts with a small MVSG over a few nodes and views, and expands it greedily, evaluating suspiciousness (using a suspiciousness metric, f) until a local optimum is reached. In short, the algorithm begins by seeding an MVSG defined over a few nodes and z views, and then utilizes an alternating maximization approach to improve the seed: the node set is kept fixed while the view set is updated, and subsequently the view set is kept fixed while the node set is updated. The updating only occurs when f increases, and since suspiciousness is bounded, convergence to a local optimum is ensured.

The method of FIG. 7 provides a heuristic for mining highly suspicious MVSGs while avoiding an enumeration strategy. The heuristic takes into consideration that entities may not exhibit suspicious behaviors in all K views/attributes simultaneously, but rather only a subset, and that it is practical to only interpretably parse a small number of relationship types between a group at once; thus, the heuristic focuses on MVSGs X (w log) such that $|\vec{k}|_1 = z$, where $z \leq K$ is generally small and can be suitably chosen and adapted according to empirical interpretability. This simplifies the analysis by considering z views, rather than $2^K-1$ views.

TABLE 2 depicts pseudo-code for the heuristic described with reference to FIG. 7 for extracting suspicious groups from an MVG G (with N nodes, K views, $\vec{C}$ masses) constrained to z≤K:

TABLE 2

| # | Step | Description |
|---|---|---|
| 1 | $\vec{k} \leftarrow$ SeedViews(G, z) | Choose z views. |
| 2 | $X_{\vec{k}} \leftarrow$ SeedNodes(G, $\vec{k}$) | Identify n nodes, $\vec{c}$ masses. (See Table 3) |
| 3 | S ← (n, $\vec{c}$, N, $\vec{C}$) | Compute suspiciousness using suspiciousness metric. |
| 4 | Do | Alternately adjust number of nodes or views in steps 4-9 |
| 5 | S' ← S | Store score. |
| 6 | k ← UpdateViews(G,X) | Revise view set. |
| 7 | $X_{\vec{k}} \leftarrow$ UpdatedNodes(G, $X_{\vec{k}}$) | Revise node set. |
| 8 | S ← (n, $\vec{c}$, N, $\vec{C}$) | Compute suspiciousness using suspiciousness metric. |
| 9 | while S > S' | Repeat until level of suspiciousness converges. |
| 10 | return $X_{\vec{k}}$, S | Return identified Group and level of suspiciousness for that group. |

UpdateViews and UpdateNodes in the pseudo code set forth in Table 2 are methods for optimizing the view set and the node set selection in order to find a highly suspicious group of entities. UpdateViews can be written concisely as $\text{argmax}_{\vec{k}} f(n, \vec{c}, N, \vec{C})$, subject to $|\vec{k}|=z$. UpdateViews independently chooses the top-z most suspicious views, given the fixed node set from the prior iteration.

UpdateNodes limits the search space to adding or removing a single node in the MVSG, which is dramatically more tractable than the $2^N-1$ possible node set choices over G. UpdateNodes can be written concisely as $\text{argmax}_x f(n, \vec{c}, N, \vec{C})$, subject to $|X'\backslash X|+|X\backslash X'|\leq 1$, meaning that each update changes the node set by, at most, a single entity (one more or one less). In computing view masses $\vec{c}$ in UpdateNodes it is possible to compute $c_i$ by cheaply maintaining the number of value frequencies in a view-specific hashmap $J_i$, such that $J_i(v)=|\{e \in X | v \in A_i(e)\}|$. Specifically, $J_i(v)$ indicates that $J_i(v)^2-J_i(v)$ similarities exist in the sub-graph view on the value v, and since each of them contribute inverse document (entity) frequency, ief(v) weight, the total mass may be written as $c_i = \Sigma_{v_i \in A_i} \text{ief}(v_i)(J_i(v_i))^2-J_i(v_i)$, where ief$(v_i)=(N/\log(1+|A_i^{-1}(v_i)|))^2$. This makes it possible to calculate view mass in linear time with respect to the number of sub-graph nodes, which drastically improves efficiency.

A reasonable seeding strategy, which is able to find candidate suspicious MVSGs and also explore G, is used to enhance update quality. SeedViews chooses z initial views such that the seeds expand to a diverse set suspicious MVSGs. In one example, z views are sampled in a weighted fashion, favoring those in which overlap occurs less frequently, e.g., using the inverse of the $q^{th}$ frequency percentiles across views as more robust estimates of their overlap propensity (e.g., q≥95). This results in lower signal-to-noise ratio views such as country being more rarely sampled.

At block 702, the suspiciousness detection system 124 obtains a multi-view graph (MVG). The suspicious group detection system 204 may obtain the multi-view graph generated by the level of suspicion detection system 202 in accordance with block 506 (FIG. 5). The suspicious group mining engine 220 of the suspicious group detection system may retrieve the MVG from database 126.

At block 704, the suspiciousness detection system 124 selects a multi-view sub-graph (MVSG) from the MVG. The multi-view sub-graph may be selected manually, e.g., by a user via API server 120 and/or web server 122, and/or automatically, e.g., by seed generator 222 using the method described below with reference to FIG. 8 and Table 3.

FIG. 8 provides a method for identifying seed values for nodes/entities that are promising for evaluation by the method of FIG. 7 due to shared attribute behaviors.

At block 802, the suspiciousness detection system 124 identifies one or more constraints. The seed generator 222 may identify the one or more constraints manually, e.g., based on input from a user via API server 120 and/or web server 122, and/or may automatically identify constraints. The one or more constraints may be a target density level and a number of attempts.

At block 804, the suspiciousness detection system 124 selects a view. The view may be one or more views of a MVG, e.g., five views. The seed generator 222 may select the view manually, e.g., based on input from a user via API server 120 and/or web server 122, and/or may automatically select the view, e.g., at random using a pseudorandom number generator.

At block 806, the suspiciousness detection system 124 initializes a candidate seed with two nodes having similarity in the selected view. The seed generator 222 may initialize the candidate seed by choosing a value from a hashmap stored in database 126.

At block 808, the suspiciousness detection system 124 adds another node (entity) to the candidate seed. The seed generator 222 may add the additional node.

At block 810, the suspiciousness detection system 124 checks if the constraint(s) has been met. The seed generator 222 may compare a density level for the current seed to a target density level and a number of attempts. If the constraints are not met, processing proceeds at block 808. Otherwise, processing proceeds at block 812.

At block 812, the seed is recorded if the constraint is met. The seed generator 222 may record the seed, e.g., in database 126 if the density of the seed is equal to or greater than the target density level.

TABLE 3 depicts pseudocode for the heuristic described with reference to FIG. 8 for selecting seed values given MVG G (N nodes, K views, P density) for views $\vec{k}$.

TABLE 3

| # | Step | Description |
|---|---|---|
| 1 | define Shuffle(S), return S in random order | |
| 2 | define Choose(S,r): return r random elements from S | |
| 3 | V ← {i | $\mathbb{1}$ $(k_i)$ } | Chosen view set |
| 4 | $H_i^{ve}$ (a) ← a ⇒ $A_i^{-1}$∀a ∈ A, i ∈ V | value-to-entity hashmap |
| 5 | $H_i^{ev}$ (a) ← a ⇒ $A_i$ ∀a ∈ A, i ∈ V | entity-to-value hashmap |
| 6 | i← Choose(V,i) | Choose a view |
| 7 | a← Choose({a||$H_i^{ve}$ (a)|≥2}, 1) | Choose a shared value |
| 8 | C← Choose($H_i^{ve}$ (a), 2) | Initialize seed with similar entities |
| 9 | for view i∈ Shuffle (V) do | |
| 10 | t← 0 | |
| 11 | while ($\rho_i$ <$P_i$ and t < 20) do | Attempt to satisfy constraint |
| 12 | $e_1$ ∈ Shuffle(V, 1) | Choose entity already in X |
| 13 | a← Choose($H_i^{ev}(e_1)$, 1) | Choose a shared value |
| 14 | $e_2$ ← Choose($H_i^{ve}$(a), 1) | Choose a similar entity |
| 15 | X ← X ∪ $e_2$ | Grow seed |

TABLE 3-continued

| # | Step | Description |
|---|---|---|
| 16 | t←t+1 | |
| 17 | end while | |
| 18 | if ($p_i$<$P_i$) then | Check if constrain met |
| 19 | go to line 6 | Start over if constraint not met in 20 tries |
| 20 | end if | |
| 21 | end if | |
| 22 | return $X_{\vec{v}}$ | Return Seeds |

This seeding heuristic enables quick discovery of good candidates. The heuristic exploits that satisfactory seeds occur when entities share more similarities, and strategically constructs a node set across views which share properties with each other. Essentially, a candidate seed is initialized with two nodes that share a similarity in a (random) one of the chosen views, and incrementally add other nodes connected to an existing seed node in views where the constraint is yet unsatisfied. If the heuristic is unable to satisfy the constraint after a predetermined number of attempts (e.g., 20), the process starts over. The process is stochastic, and thus enables high seed diversity and diverse suspicious MVSG discovery. Additionally, it finds seeds 100-1000× faster than random seeding on real data. This is because random seeding struggles significantly in meeting constraints as the number of views increases.

Referring back to FIG. 7, at block 706, the suspiciousness detection system 124 determines the level of suspicion for the multi-view sub-graph. The suspiciousness group mining engine 220 may determine the level of suspiciousness in a similar manner as the scoring engine 212 described above in reference to block 510 (FIG. 5).

At block 708, the suspiciousness detection system 124 revises the multi-view sub-graph. The suspicious group mining engine 220 may update the multi-view graph by adding/subtracting an entity and/or a level. In one example, the suspicious group mining engine alternates between adding/subtracting an entity and adding/subtracting a level. The suspicious group mining engine 220 may determine whether to add or subtract based on a pseudo random number generator where an even generated number results in an addition and an odd generated number results in a subtraction.

At block 710, the suspiciousness detection system 124 determines the level of suspicion for the revised multi-view sub-graph. The suspiciousness group mining engine 220 may determine the level of suspiciousness as described above for block 706.

At block 712, the suspiciousness detection system 124 compares the level of suspiciousness for the revised multi-view sub-graph to the level of suspiciousness for the multi-view graph prior to being revised. If the suspiciousness level of the revised multi-view sub-graph is greater, processing proceeds at block 708 (i.e., to identify a group with an even higher level of suspicion).

At block 714, the suspiciousness detection system 124 records an identifier for the multi-view graph prior to being revised and the associated level of suspicion for that graph. The suspicious group mining engine 220 may record the identifier and the associated level of suspicion in a table within the database 126.

At block 716, the suspiciousness detection system 124 repeats the method of FIG. 7. The suspicious group detection system 204 may repeat the process of identifying new multi-view sub-graphs having a high level until all multi-view sub-graphs meeting a constraint, e.g., up to 5 levels, have been scored.

At block 718, the suspiciousness detection system 124 presents the recorded values. The suspicious group detection system 204 may present a subset of the recorded values (e.g., top 20 suspiciousness values) on a display of the client device 110, e.g., via web server 122 and web client 112. Prior to presentation, the suspicious group detection system may aggregate and filter the recorded values for review by, for example, pruning "redundant" MVSGs covering the same set of nodes, e.g., using a Jaccard similarity threshold T to determine overlap.

In one example, many instances of the method described with reference to FIGS. 7 and 8 are run in parallel to speed up the identification of suspicious groups. For example, thousands of seed generation and expansion processes may be run simultaneously in a multi-threaded setting, with results aggregated in a ranked list.

Aspects of the suspicious group detection and scoring methods described herein differ from prior approaches in the following, non-limiting ways, (1) casting multi-attribute group detection into a multi-view graph formulation, (2) simultaneously mining nodes and views to maximize a novel metric, and/or (3) using a compressed data representation, unlike other methods which incur massive complexity due to dense matrix/tensor representation.

Figure 9:
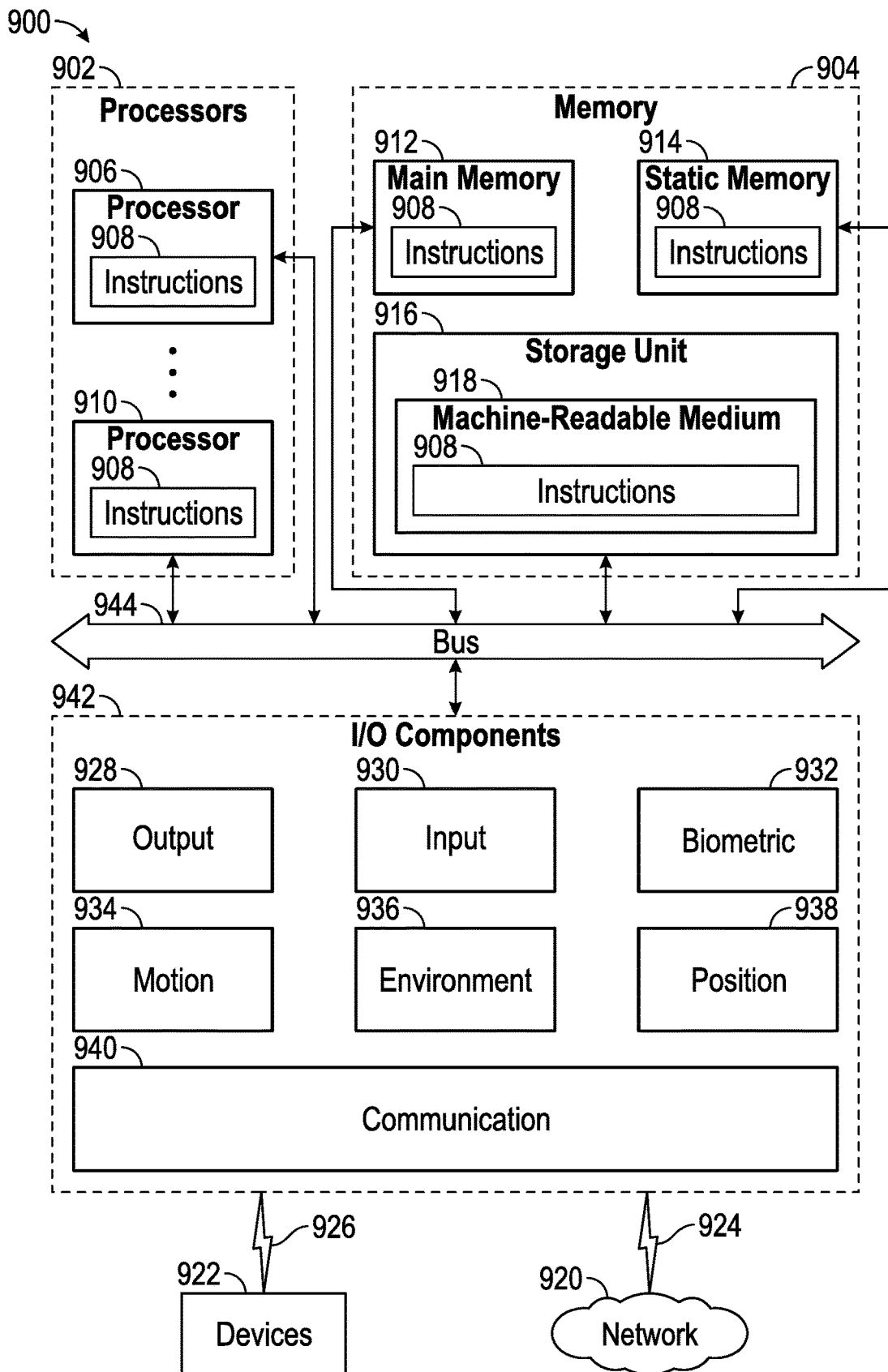
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
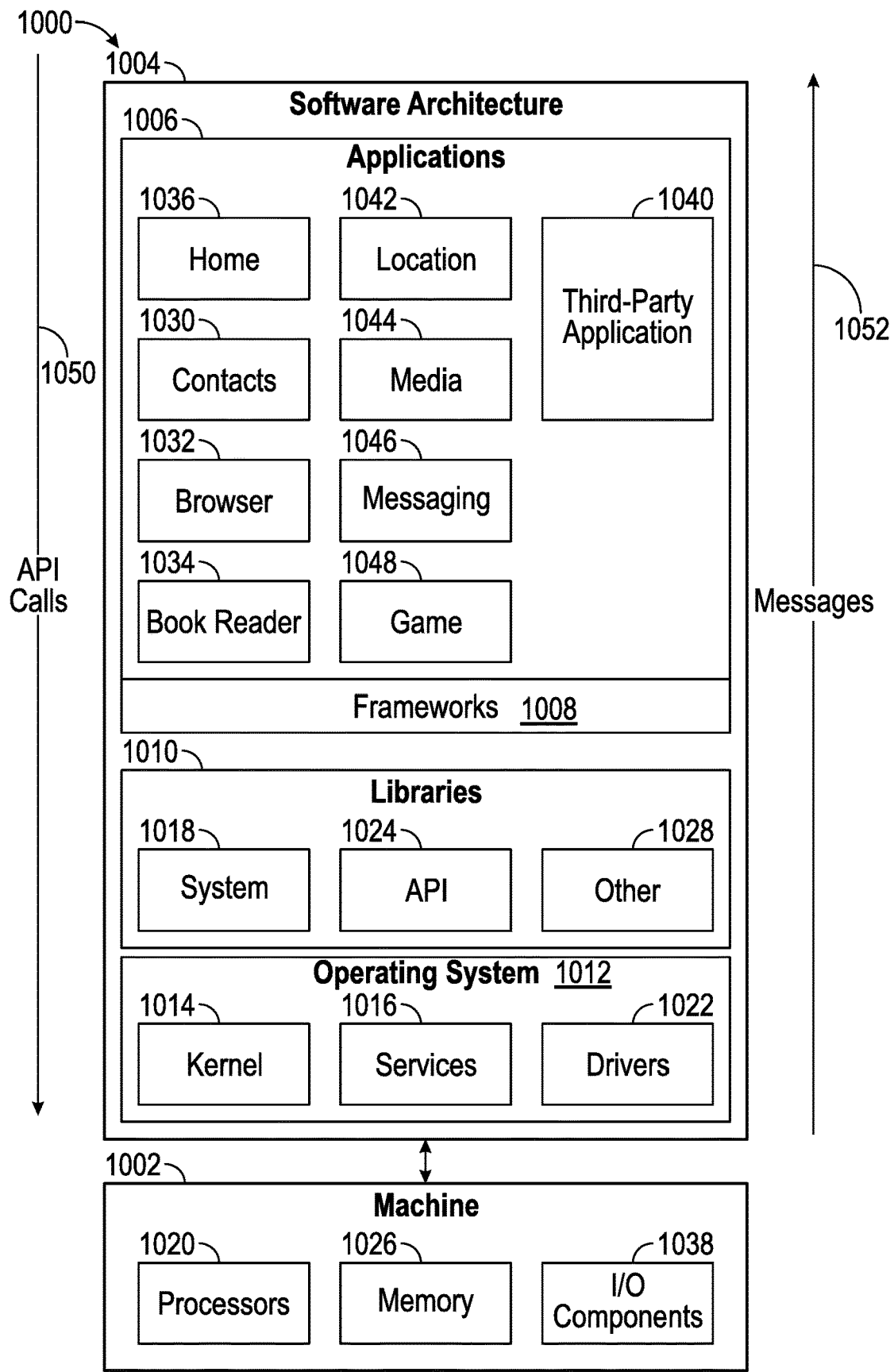
FIG. 10 is block diagram showing a software architecture within which the present disclosure may be implemented, in accordance with examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as +10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A method for determining a level of suspicion for a group of entities from a dataset of entity and entity attribute information, the method comprising:
receiving, at a processor, entity identifiers and attribute identifiers associated with entities;
generating, by the processor, a multi-view graph from the dataset of entity and entity attribute information using the entity identifiers and the attribute identifiers, each node of the multi-view graph corresponding to a respective one of the entity identifiers, each view of the multi-view graph corresponding to a respective one of the attribute identifiers, and each edge between the nodes of a respective view having an edge weight corresponding to attribute value overlap between those nodes in that view;
identifying, by the processor, a multi-view sub-graph within the multi-view graph, the multi-view sub-graph including more than one view for the group of entities; and
determining, by the processor, the level of suspicion of the group of entities by scoring the identified multi-view sub-graph using a suspiciousness metric for the group of entities that is a function of the number of edges between nodes and a ratio of edge weights to the number of edges between nodes corresponding to the multi-view sub-graph for the group of entities.

2. The method of claim 1, wherein the scoring comprises:
defining a mass, c, of the multi-view sub-graph to be the total sum of the edge weights for all edges between nodes for the multi-view sub-graph including the more than one view for the group of entities;
defining a volume, v, as the possible number of edges between the nodes for the group of entities;
defining a density, p, as the ratio between the mass and the volume; and
satisfying a condition that given two multi-view sub-graphs having the same mass and volume in all but two views, both multi-view sub-graphs including more than one view, a view density of a first of the two views for all entities is less than a view density of a second of the two views for all entities, and the mass of the first view for a first of the two multi-view sub-graph and the mass of the second view for a second of the two multi-view sub-graph is greater than the mass of the second view for the second of the two multi-view sub-graph and the mass of the first view for the first of the two multi-view sub-graph, the first of the two multi-view sub-graphs has a higher level of suspicion.

3. The method of claim 2, wherein the scoring satisfies the following additional condition:
given the two multi-view sub-graph have the same volume in all views and the same mass in all but one view, the first of the two multi-view sub-graph is more suspicious if the mass of the first multi-view sub-graph is greater than the mass of the second multi-view sub-graph.

4. The method of claim 2, wherein the scoring satisfies the following additional condition:
given the two multi-view sub-graph have the same density in all views and the same volume in all but one view, the first of the two multi-view sub-graph is more suspicious if the volume of the first multi-view sub-graph is greater than the volume of the second multi-view sub-graph.

5. The method of claim 2, wherein the scoring satisfies the following additional condition:
given the two multi-view sub-graph have the same volume and the same mass in all views and the multi-view graph has the same density in all but one view, the first of the two multi-view sub-graph is more suspicious if a density of the multi-view graph for the first view is greater than the density of the multi-view graph for the second view.

6. The method of claim 1, wherein the scoring comprises:
summing the edge weights, c, between nodes, n;
determining the number of edges, v, between nodes;
determining a ratio, p, of weights to the number of edges; and
scoring the multi-view sub-graph using the suspiciousness metric:

$$\hat{f}(n,\vec{p},N,\vec{P}) = \Sum_{i=1}^{K} v \log(P_i) - v \log(\rho_i) - v + \log \rho_i + v\rho_i/P_i.$$

7. The method of claim 6, wherein the determining performed by the processor is performed for multiple groups of entities and comprises:
identifying a multi-view sub-graph corresponding to the multiple groups of entities where the ratio exceeds a predetermined threshold, and
determining the level of suspicion for the identified multi-view sub-graph.

8. The method of claim 1, wherein the entity identifiers include at least one entity identifier selected from a group comprising a user, a user group, an account, an object, and an organization.

9. The method of claim 1, wherein the attribute identifier includes at least one attribute identifier selected from a group comprising a file uploaded identity, a webpage Uniform Resource Locator (URL), creation date, and an Internet Protocol (IP) address used.

10. A system for determining a level of suspicion for a group of entities from a dataset of entity information, the system comprising:
a memory that stores instructions; and
a processor configured by the instructions to perform operations comprising:
receiving entity identifiers and attribute identifiers associated with entities;
generating a multi-view graph from the dataset of entity information using the entity identifiers and the attribute identifiers, each node of the multi-view graph corresponding to a respective one of the entity identifiers, each view of the multi-view graph corresponding to a respective one of the attribute identifiers, and each edge between the nodes of a respective view having an edge weight corresponding to attribute value overlap between those nodes in that view;
identifying a multi-view sub-graph within the multi-view graph, the multi-view sub-graph including more than one view for the group of entities; and
determining the level of suspicion of the group of entities by scoring the identified multi-view sub-graph using a suspiciousness metric for the group of entities that is a function of the number of edges between nodes and a ratio of edge weights to the number of edges between nodes corresponding to the multi-view sub-graph for the group of entities.

11. The system of claim 10, wherein the scoring comprises:
defining a mass, c, of the multi-view sub-graph to be the total sum of the edge weights for all edges between nodes for the multi-view sub-graph including the more than one view for the group of entities;
defining a volume, v, as the possible number of edges between the nodes for the group of entities;
defining a density, p, as the ratio between the mass and the volume; and
satisfying a condition that given two multi-view sub-graphs having the same mass and volume in all but two views, both multi-view sub-graphs including more than one view, a view density of a first of the two views for all entities is less than a view density of a second of the two views for all entities, and the mass of the first view for a first of the two multi-view sub-graph and the mass of the second view for a second of the two multi-view sub-graph is greater than the mass of the second view for the second of the two multi-view sub-graph and the mass of the first view for the first of the two multi-view sub-graph, the first of the two multi-view sub-graphs has a higher level of suspicion.

12. The system of claim 11, wherein the scoring satisfies the following additional conditions:
given the two multi-view sub-graph have the same volume in all views and the same mass in all but one view, the first of the two multi-view sub-graph is more suspicious if the mass of the first multi-view sub-graph is greater than the mass of the second multi-view sub-graph.

13. The system of claim 11, wherein the scoring satisfies the following additional conditions:
given the two multi-view sub-graph have the same density in all views and the same volume in all but one view, the first of the two multi-view sub-graph is more suspicious if the volume of the first multi-view sub-graph is greater than the volume of the second multi-view sub-graph.

14. The system of claim 11, wherein the scoring satisfies the following additional conditions:
given the two multi-view sub-graph have the same volume and the same mass in all views and the multi-view graph has the same density in all but one view, the first of the two multi-view sub-graph is more suspicious if a density of the multi-view graph for the first view is greater than the density of the multi-view graph for the second view.

15. The system of claim 10, wherein the scoring comprises:
summing the edge weights, c, between nodes, n;
determining the number of edges, v, between nodes;
determining a ratio, p, of weights to the number of edges; and
scoring the multi-view sub-graph using the suspiciousness metric:

$$\hat{f}(n,\vec{p},N,\vec{P}) = \Sigma_{i=1}^{K} v \log(P_i) - v \log(\rho_i) - v + \log \rho_i + v\rho_i / P_i.$$

16. The system of claim 15, wherein the determining performed by the processor is performed for multiple groups of entities and comprises:
identifying a multi-view sub-graph corresponding to the multiple groups of entities where the ratio is greater than a predetermined threshold, and
determining the level of suspicion for the identified multi-view sub-graph.

17. The system of claim 10, wherein the entity identifiers include at least one entity identifier selected from a group comprising a user, a user group, an account, an object, and an organization.

18. The system of claim 10, wherein the attribute identifier includes at least one attribute identifier selected from a group comprising a file uploaded identity, a webpage Uniform Resource Locator (URL), creation date, and an Internet Protocol (IP) address used.

19. A non-transitory processor-readable storage medium storing processor-executable instructions that, when executed by a processor of a machine, cause the machine to perform operations comprising:
receiving, at the processor, entity identifiers and attribute identifiers associated with entities;
generating, by the processor, a multi-view graph from the dataset of entity information using the entity identifiers and the attribute identifiers, each node of the multi-view graph corresponding to a respective one of the entity identifiers, each view of the multi-view graph corresponding to a respective one of the attribute identifiers, and each edge between the nodes of a respective view having an edge weight corresponding to attribute value overlap between those nodes in that view;
identifying, by the processor, a multi-view sub-graph within the multi-view graph, the multi-view sub-graph including more than one view for the group of entities; and
determining, by the processor, the level of suspicion of the group of entities by scoring the identified multi-view sub-graph using a suspiciousness metric for the group of entities that is a function of the number of edges between nodes and a ratio of edge weights to the number of edges between nodes corresponding to the multi-view sub-graph for the group of entities.

20. The non-transitory processor-readable storage medium of claim 19, further comprising instructions that when executed by the processor execute the scoring by defining a mass, c, of the multi-view sub-graph to be the total sum of the edge weights for all edges between nodes for the multi-view sub-graph including the more than one view for the group of entities, defining a volume, v, as the possible number of edges between the nodes for the group of entities, defining a density, p, as the ratio between the mass and the volume, and satisfying a condition that given two multi-view sub-graphs having the same mass and volume in all but two views, both multi-view sub-graphs including more than one view, a view density of a first of the two views for all entities is less than a view density of a second of the two views for all entities, and the mass of the first view for a first of the two multi-view sub-graph and the mass of the second view for a second of the two multi-view sub-graph is greater than the mass of the second view for the second of the two multi-view sub-graph and the mass of the first view for the first of the two multi-view sub-graph, the first of the two multi-view sub-graphs has a higher level of suspicion, and
wherein the determining performed by the processor is performed for multiple groups of entities and comprises:
identifying a multi-view sub-graph corresponding to the multiple groups of entities where the ratio is greater than a predetermined threshold, and
determining the level of suspicion for the identified multi-view sub-graph.

* * * * *